Feb. 5, 1929.
F. A. WHITTEN
1,701,400
MOTOR SUPPORT
Filed Aug. 3, 1925
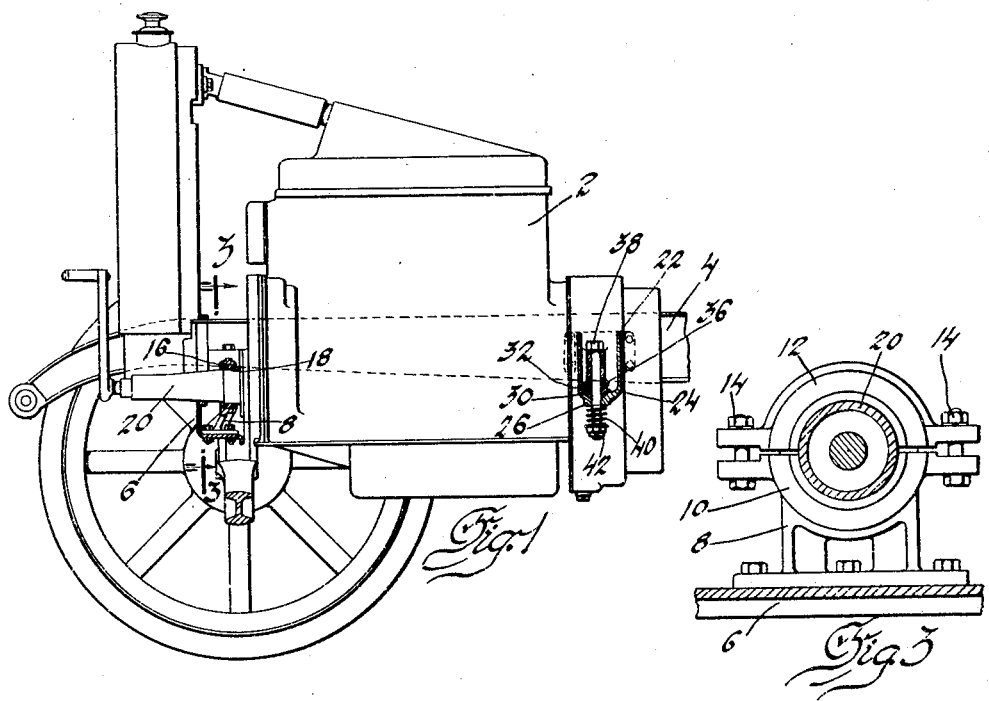
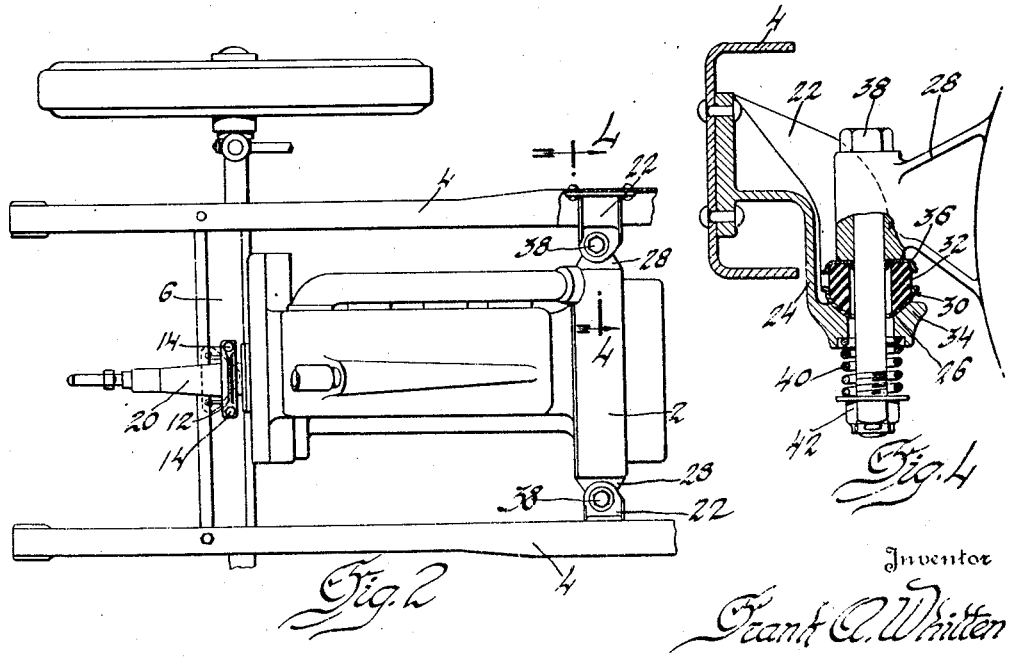
Inventor
Frank A. Whitten
By Blackmore, Spencer & Flint
Attorney Patented Feb. 5, 1929.

1,701,400

UNITED STATES PATENT OFFICE.

FRANK A. WHITTEN, OF DETROIT, MICHIGAN, ASSIGNOR TO GENERAL MOTORS CORPORATION, OF DETROIT, MICHIGAN, A CORPORATION OF DELAWARE.

MOTOR SUPPORT.

Application filed August 3, 1925. Serial No. 47,889.

In mounting a motor upon a vehicle frame it is not only desirable that the motor be allowed great flexibility of movement so that weaving and rocking of the frame will not cause serious injury to the motor but it is also desirable that the motor be cushioned from the shocks to which the frame is subjected, such cushioning serving also to absorb some of the vibration of the engine and to eliminate noise and rattle. In this application I have disclosed one type of cushioned flexible mounting which has been found to be very satisfactory in practice. Preferably the mounting is of the three-point type but this is not essential. In the specific form illustrated the mounting comprises a front motor support permitting oscillation of the motor about a longitudinal axis and at the same time embodies a cushioning means to take up slight shocks, and rear motor supports characterized by the fact that the motor is permitted universal tilting movement with respect to the frame, these supports also embodying cushioning means. In each instance I have preferred to use for my cushioning means a confined block of resilient material, such as rubber, which is normally under compression whereby the life of the rubber is materially lengthened.

In the drawings:

Figure 1 is a side elevation of portions of a vehicle frame and its motor, the supports for the latter being shown in section;

Figure 2 is a plan view of the construction shown in Figure 1, parts being broken away;

Figure 3 is a section on line 3—3 of Figure 1; and

Figure 4 is a view taken substantially on line 4—4 of Figure 2.

2 indicates a motor of the type used upon automobiles, and 4 indicates the side members of the frame upon which it is mounted. 6 indicates a front cross member connecting the side members and having a bracket 8 secured thereon by any preferred means. The upper part of this bracket is formed to provide a semi-circular bearing member 10 to which a semi-circular bearing cap 12 is secured by bolts 14. The inner surfaces of these bearing members are grooved as shown at 16 to receive an annular cushioning member 18 which may be of rubber. Through this rubber annulus projects a part 20 which may be either secured to or integral with the engine housing. This part preferably extends in alinement with the usual crank shaft and serves as a housing for the customary starting crank. The rubber cushion, confined in the groove 16, is put under compression by drawing up bolts 14.

It will be noted that this front motor support permits a slight amount of rotation of the engine about a longitudinal axis and at the same time serves to cushion the motor.

The motor is also provided with rear supporting devices, one on each side thereof, and as these are substantially identical but one will be described. Projecting from the frame member 4 is a bracket 22 which may embody a depending arm 24 having a spherical socket 26 formed therein. The rear end of the motor housing is provided with an arm 28 overlying the socket 26 and between the arm and the socket I have preferably interposed a resilient spherical device 30 consisting of a substantially spherical block 32 of resilient material, such as rubber, this block seating in a cup-shaped member 34 which in turn seats in the socket 26. Between the block 32 and the arm 28 I have also interposed a second cup-shaped member 36. A bolt 38 passes through alined apertures provided in the arm 28, cup-shaped member 36, block 32, cup-shaped member 34, and arm 24, and the lower end of the bolt is encircled by a coil spring 40 which bears at one end against the under side of the arm 24 and at the other end against a fastening means such as a nut 42 which is preferably drawn up to place the block and spring under compression.

It will be apparent that the cup-shaped members 34 and 36 serve as antifriction washers to permit tilting movement of the motor with respect to the frame in the same manner as if the block 32 were not provided. They also serve to confine the block 32, and as the block is always under compression owing to the action of the spring 40 and, except in the case of severe jolting, to the weight of the engine, the life of the rubber is greatly prolonged.

Of course, if preferred, the socket 26 and the member 34 need not be spherical in shape, the distortion of the rubber block 32 alone being relied upon to take care of any misalinement of the parts. In such case the block may be of other than spherical shape, thus it may be in the form of a cylinder or of a rectangular block.

With the motor mounted in the manner described it is apparent that it is capable of greatly varied movement and that all these movements are effectively cushioned by the interposed resilient material so that a considerable amount of the usual vibration of the engine is absorbed as well as shocks received by the frame.

I claim:

1. The combination of a vehicle frame, a bracket extending from the frame and having a spherical socket formed therein, a casing member having an arm projecting therefrom and overhanging said socket, means connecting said arm and bracket and yieldingly resisting separation thereof, and a resilient spherical device interposed between said arm and bracket and seating in said socket permitting universal movement of the arm with respect to the frame and at the same time serving as a cushion.

2. In the structure as defined by claim 1, said spherical device comprising a cup-shaped member fitting said socket, a block of rubber seated in said cup-shaped member, and an antifriction washer interposed between the block and the arm.

3. The combination of a frame member provided with a socket, a casing member having an arm projecting outwardly therefrom and overlying said socket, a block of resilient material seated in the socket, a bolt passing through the arm, block, and socket, a spring on the bolt bearing against the under side of the socket, and a nut on the bolt holding the parts against separation and the spring and block under compression.

4. In the construction as defined by claim 3, a cup-shaped member interposed between the block and socket to reduce the friction therebetween and permit tilting action.

5. In a three-point suspension for the engines of motor vehicles, the combination of a frame comprising side members and a cross member, a bracket on said cross member providing an annular seat, an annular bushing of resilient material in said seat, a motor housing having an arm seated in said bushing, and a plurality of arms extending laterally therefrom, brackets on said side frame members having sockets therein, said arms overlying said sockets, blocks of resilient material interposed between the arms and sockets, devices for confining said blocks, and means for securing the parts in operative relation and adapted to yieldingly put said blocks under compression.

6. In the structure as defined by claim 5, the means for confining said blocks comprising washers between the blocks and the arms and sockets, the washers engaging in said sockets being spherical in shape and cooperating with the sockets to permit universal tilting action.

7. In an automobile engine mounting the combination of a supporting member, an engine provided with a supporting arm, a block of rubber interposed between said supporting member and arm, and means for yieldingly securing said arm to said supporting member so that the rubber is maintained under abnormal compression.

8. In an automobile engine mounting the combination of a supporting member, an engine provided with a supporting arm, a block of rubber interposed between said supporting member and arm, means for confining said block against distortion throughout a considerable portion of its surface, and means for yieldingly securing said arm to said supporting member so that the rubber is maintained under abnormal compression.

9. In the combination as defined in claim 8, said last named means comprising a bolt passing through said arm, supporting member and rubber block, and resilient means for applying yielding tension to said bolt.

10. In an automobile the combination of a supporting member, a casing provided with a supporting arm, a block of rubber interposed between said member and arm, cups for the ends of said block, one of said cups bearing against the supporting member and the other against the supporting arm, and resilient means for securing said member to said arm and yieldingly maintaining said rubber under initial compression.

11. Means to support an internal combustion engine upon a vehicle frame including in combination a bracket carried by the frame, an engine arm overlying and supported by the bracket, a block of elastic cushioning material interposed between said arm and bracket, a fastening bolt connecting said arm and bracket and a resilient coil spring surrounding the bolt and having a fixed bearing on said bracket and adapted to exert its tension upon the bolt for yieldingly holding the engine arm on said bracket and maintaining said block under initial pressure.

In testimony whereof I affix my signature.

FRANK A. WHITTEN.